US009796295B2

(12) United States Patent
Potter et al.

(10) Patent No.: US 9,796,295 B2
(45) Date of Patent: *Oct. 24, 2017

(54) ELECTRIFIED MONORAIL CONVEYER SYSTEM

(71) Applicant: Automatic Systems, Inc., Kansas City, MO (US)

(72) Inventors: Kim Wayne Potter, Lee's Summit, MO (US); Craig Steven Wise, Cleveland, MO (US)

(73) Assignee: Automatic Systems, Inc., Kansas City, MO (US)

(*) Notice: Subject to any disclaimer, the term of this patent is extended or adjusted under 35 U.S.C. 154(b) by 189 days.

This patent is subject to a terminal disclaimer.

(21) Appl. No.: 14/753,709

(22) Filed: Jun. 29, 2015

(65) Prior Publication Data

US 2016/0096447 A1 Apr. 7, 2016

Related U.S. Application Data

(63) Continuation of application No. 13/834,312, filed on Mar. 15, 2013, now Pat. No. 9,096,145.

(60) Provisional application No. 61/644,242, filed on May 8, 2012.

(51) Int. Cl.
*B60M 1/30* (2006.01)
*B61B 13/04* (2006.01)
*B60M 3/00* (2006.01)

(52) U.S. Cl.
CPC ............... *B60M 1/30* (2013.01); *B60M 3/00* (2013.01); *B61B 13/04* (2013.01); *Y02T 30/30* (2013.01)

(58) Field of Classification Search
CPC .... B60L 1/00; B60L 3/00; B60L 3/007; B60L 5/00; B60L 5/04; B60M 1/00; B60M 1/02; B60M 1/06; B60M 7/00; B61B 3/00
See application file for complete search history.

(56) References Cited

U.S. PATENT DOCUMENTS

| 4,545,303 | A | * | 10/1985 | Fujita | ............... E01B 25/24 104/110 |
| 8,375,865 | B2 | | 2/2013 | Zayas | |
| 9,096,145 | B2 | * | 8/2015 | Potter | ............... B60M 1/30 |

FOREIGN PATENT DOCUMENTS

| JP | S64-89902 A | 4/1989 |
| JP | H03-49505 A | 3/1991 |
| JP | H07-33014 A | 2/1995 |

(Continued)

OTHER PUBLICATIONS

International Search Report and Written Opinion dated Sep. 13, 2013 for Application No. PCT/US2013/039879, 9 pgs.

(Continued)

*Primary Examiner* — Robert J. McCarry, Jr.
(74) *Attorney, Agent, or Firm* — Frost Brown Todd LLC

(57) ABSTRACT

An apparatus comprises a conductor bar operable to form a portion of a track. The apparatus further comprises a plurality of carriers. Each of the plurality of carriers comprises a collector shoe operable to engage the conductor bar to enable each of the plurality of carriers to advance along the track. The apparatus further comprises a motor power control device configured to deliver power to the collector shoes associated with each of the plurality of carriers to drive the plurality of carriers along the track.

19 Claims, 13 Drawing Sheets

(56) References Cited

FOREIGN PATENT DOCUMENTS

JP        H07-264722 A      10/1995

OTHER PUBLICATIONS

Mexican Office Action dated Feb. 5, 2016 for Application No. MX/a/2014/013602, 4 pgs.
U.S. Appl. No. 61/644,242, filed May 8, 2012.

* cited by examiner

ELECTRIFIED MONORAIL CONVEYER SYSTEM

PRIORITY

This application is a continuation of U.S. patent application Ser. No. 13/834,312, entitled "Electrified Monorail Conveyer System," filed Mar. 15, 2013 and published as U.S. Patent Publication No. 2013/0299292 on Nov. 14, 2013, which claims priority to U.S. Provisional Patent Application No. 61/644,242, filed May 8, 2012 and entitled "Electrified Monorail Conveyer Systems (EMS)," the disclosures of which are incorporated by reference herein.

BACKGROUND

An EMS is a conveyor system that is "electrified" via conductor bar installed on the conveying rail and a collector shoe system installed on the carriers that travel on the monorail. The conductor bar system provides power, control signals, and/or communication. This is then transferred to the mobile carrier over collector shoes to the onboard control system. Onboard controls typically consist of a PLC, VFD, sensors, relays, terminals, panel housing, etc. This makes the mobile carrier "smart" and works with the overall system control. This controls arrangement is then repeated on every carrier in the system. As the quantity of carriers in the system increase, so do the overall controls components within the system and overall cost and complexity.

While a variety of electrified monorail conveyer systems have been made and used, it is believed that no one prior to the inventor(s) has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
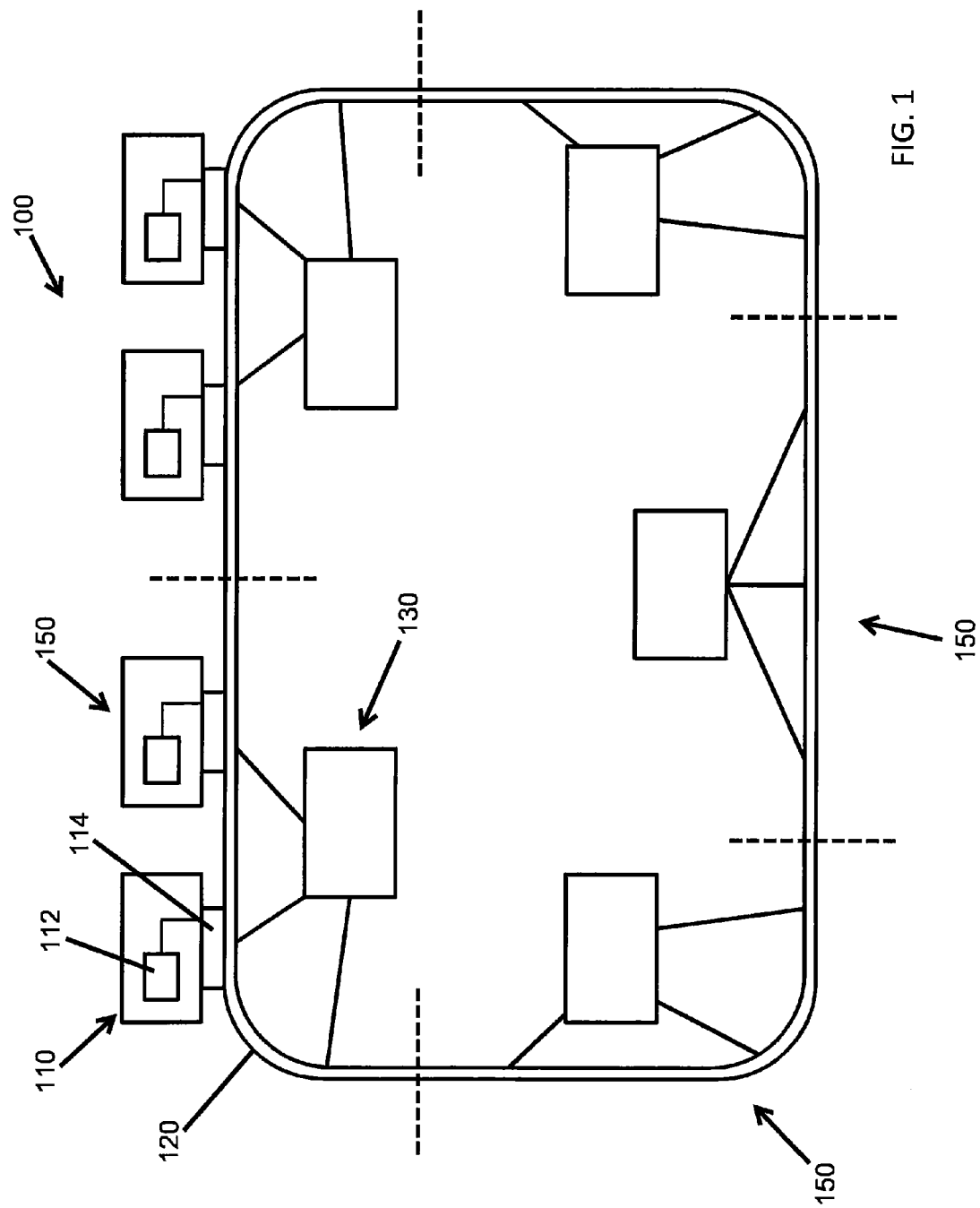
FIG. 1 depicts a top diagrammatic view of an exemplary electrified monorail system.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one mode contemplated for carrying out the invention. As will be realized, the invention is capable of other different and obvious aspects, all without departing from the invention. Accordingly, the drawings and descriptions should be regarded as illustrative in nature and not restrictive.

FIG. 1 shows an exemplary electrified monorail system (100) (hereinafter "EMS"). EMS (100) comprises at least one carrier (110), a conductor bar (120), a plurality of VFD regions (150), and one or more variable frequency drives (130) (hereinafter "VFD"). Each of the carriers (110) includes a collector shoe (114) and a motor (112). It will be understood that carriers (110) are operable to travel around EMS (100) along the path provided by conductor bar (120). In the exemplary version, a rounded rectangular path for conductor bar (120) is shown, but it will be appreciated that conductor bar (120) may be shaped as any suitable path for carriers (110) as would be apparent to one of ordinary skill in the art in view of the teachings herein.

Collector shoe (114) is operable to connect carrier (110) with conductor bar (120). VFD (130) is in communication with conductor bar (120), which in turn is in communication with motor (112) of carrier (110). Thus VFD (130) uses collector shoe (114) to engage motor (112). As a result, VFD (130) is operable to provide power to run motor (112), which drives carrier (110) around conductor bar (120). It will be appreciated that carriers (110) may be configured to advance around conductor bar (120) in a clockwise manner. However, in some versions, carriers (110) may be driven around conductor bar (120) in a counterclockwise manner. In other versions of EMS (100), it will further be understood that carrier (110) may be driven in a non-circular manner according to the path defined by conductor bar (120). VFDs (130) are configured to be remotely controlled by a user or other program such that VFDs (130) may be directed to instruct movement of carriers (110).

Portions of EMS (100) are divided into zones (150). In the exemplary version, five VFD regions (150) are shown that form EMS (100), but in other versions, any suitable number of zones may be used as would be apparent to one of ordinary skill in the art in view of the teachings herein. VFDs (130) are distributed among VFD regions (150) such that one VFD (130) is assigned to every VFD region (150). As a result, each VFD (130) is operable to provide power to carriers (110) as they advance through VFD regions (150). In some instances, VFD (130) may comprise an ALLEN BRADLEY PowerFlex 775 AC Drive from Rockwell Automation located in Milwaukee, Wis. VFD (130) may be configured to provide Ethernet/IP connectors, provide air cooling, and provide AC input with DC terminals. However, it will be understood that any suitable VFD (130) may be used as would be apparent to one of ordinary skill in the art in view of the teachings herein.

Carrier (110) comprises motor (112) and collector shoe (114). Collector shoe (114) is operable to engage conductor bar (120). It will be appreciated that collector shoe (114) and conductor bar (120) may engage each other electrically or mechanically or through any other suitable method as would be apparent to one of ordinary skill in the art in view of the teachings herein. Motor (112) is operable to be powered by VFD (130) through conductor bar (120). Motor (112) in the exemplary version may include a gear motor such as a sew helical/worm gear motor. Such a motor (112) may be operable to provide for instance a 1,044 inch/lbs of torque with a motor RPM of 1690 and an output RPM of 44.21. However, it will be understood that other suitable motors (112) operable to drive carrier (110) may be used as would be apparent to one of ordinary skill in the art in view of the teachings herein. As will be described in further detail below, conductor bar (120) is operable to carry a variety of rails. In the exemplary version, motor (112) includes an AC powered motor, though it will be understood that any suitable AC or DC powered motor may be used as would be apparent to one of ordinary skill in the art. Driving carrier (110) along conductor bar (120) will be described in further detail below.

Figure 2:
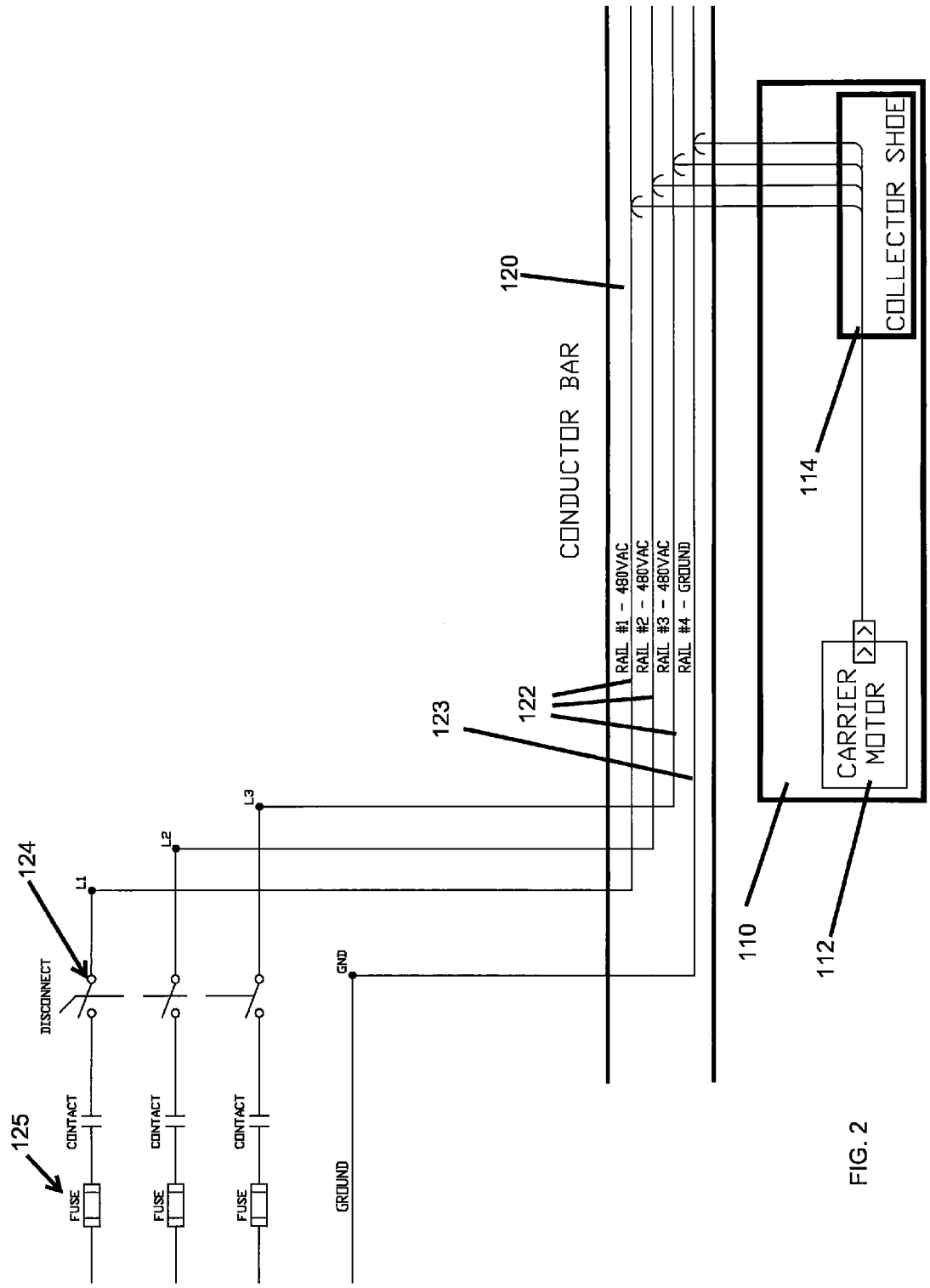
FIG. 2 depicts an enlarged diagrammatic view of the electrified monorail system of FIG. 1 showing the conductor bar.

FIG. 2 shows a more detailed view of the interaction between carrier (110) and conductor bar (120). Conductor bar (120) is in communication with collector shoe (114). Conductor bar (120) comprises a plurality of power rails (122) configured to deliver power to carrier (110). In particular, rails (122) are operable to deliver 480 VAC power. However, it will be understood that any suitable power amount may be provided to carrier (110). For instance, any suitable voltage rating and either AC or DC current could be provided. Other suitable parameters may be used as would be apparent to one of ordinary skill in the art in view of the teachings herein. Furthermore, conductor bar (120) comprises a ground (123). Power rails (122) are in communication with switches (124) and fuses (125) operable to halt the flow of current through conductor bar (120).

Rails (122) deliver power to carrier (110) through collector shoe (114). Collector shoe (114) may be configured to engage conductor bar (120) through a power contactor. Such a contactor may include an ALLEN BRADLEY 280 full voltage start, having an Ethernet/IP interface, and rated at 24 VDC and 25 A. It will be appreciated however that any suitable means for establishing communication between conductor bar (120) and collector shoe (114) may be used as would be apparent to one of ordinary skill in the art in view of the teachings herein. Collector shoe (114) is in communication with motor (112). Thus, rails (122) are operable to deliver power to motor (112). Motor (112) is then operable to advance carrier (110) along conductor bar (120). While the exemplary version shows a single motor (112), it will be appreciated that any suitable number of motors (113) may be used as would be apparent to one of ordinary skill in the art in view of the teachings herein.

Figure 3:
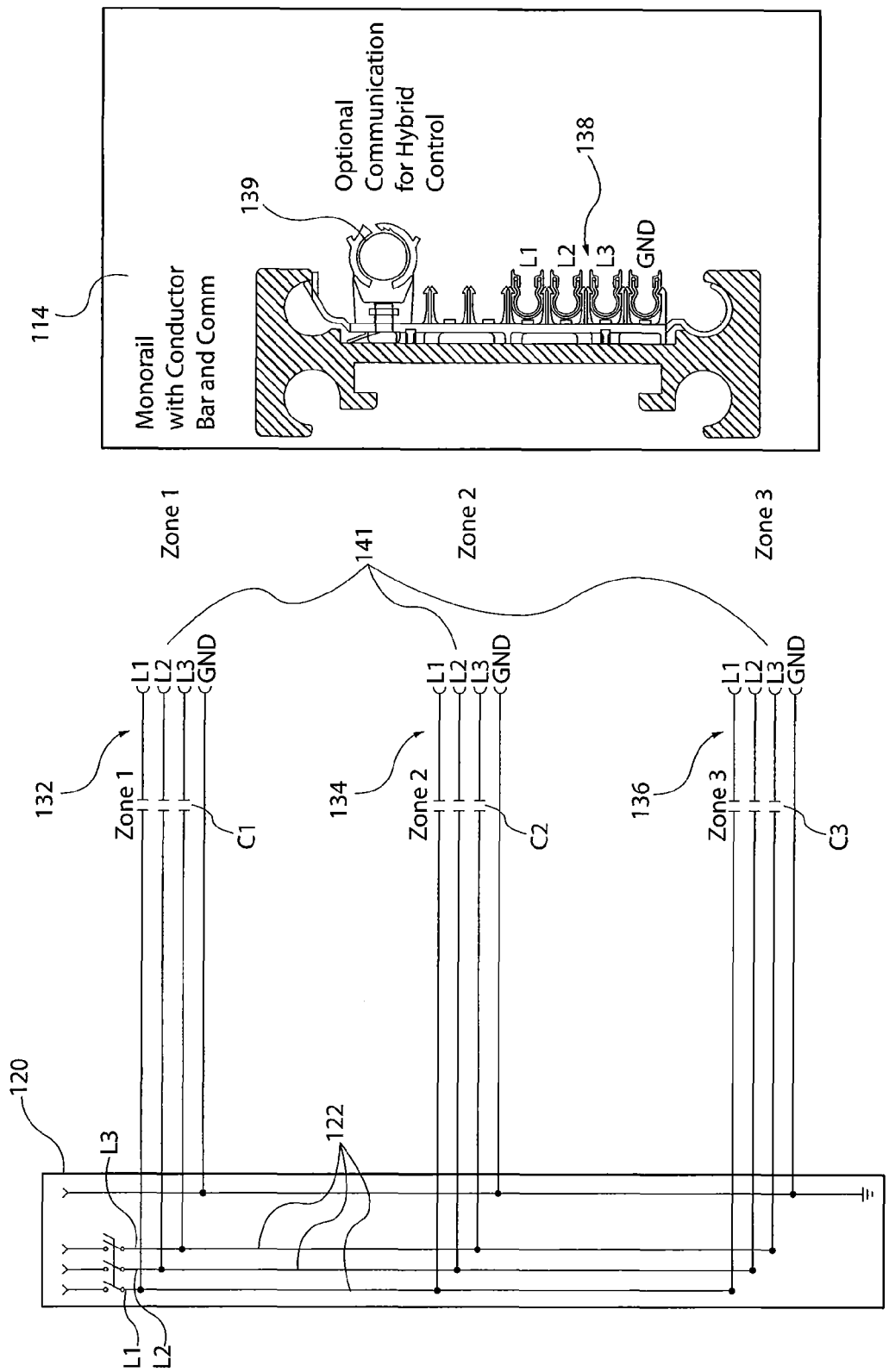
FIG. 3 depicts a schematic view of the interface between the conductor bar and the collector shoe of the electrified monorail system of FIG. 1.

FIG. 3 shows a more detailed view of collector shoe (114) and conductor bar (120). Each VFD region (150) (shown in FIG. 1) comprises a plurality of zones (132, 134, 136). In the exemplary version, three zones (132, 134, 136) are used, but it will be appreciated that any suitable number of zones may be used as would be apparent to one of ordinary skill in the art in view of the teachings herein. For instance, two, four, five or more zones may be used. In the exemplary version, each VFD region (150) comprises a first zone (132), a second zone (134), and a third zone (136). VFD (130) is configured to power each of zones (132, 134, 136) independently, though it will be understood that VFD (130) may power more than one of zone (132, 134, 136) at a time. The illustrated version shows VFDs (130) serially aligned and adjacent with each other. Rails (122) of conductor bar (120) branch off into a first zone (132), a second zone (134), and a third zone (136). Any of zones (132, 134, 136) may engage collector shoe (114). Collector shoe (114) comprises interface leads (138) operable to establish electrical communication with any of zones (132, 134, 136). Collector shoe (114) further comprises an optional communication connection (139), which may be used for hybrid controls, which will be discussed in further detail below.

Leads (138) are configured to match with leads (141) of zones (132, 134, 136). Once collector shoe (114) engages a zone, such as first zone (132), conductor bar (120) is operable to deliver power through collector shoe (114) to motor (112) of carrier (114).

Figure 4:
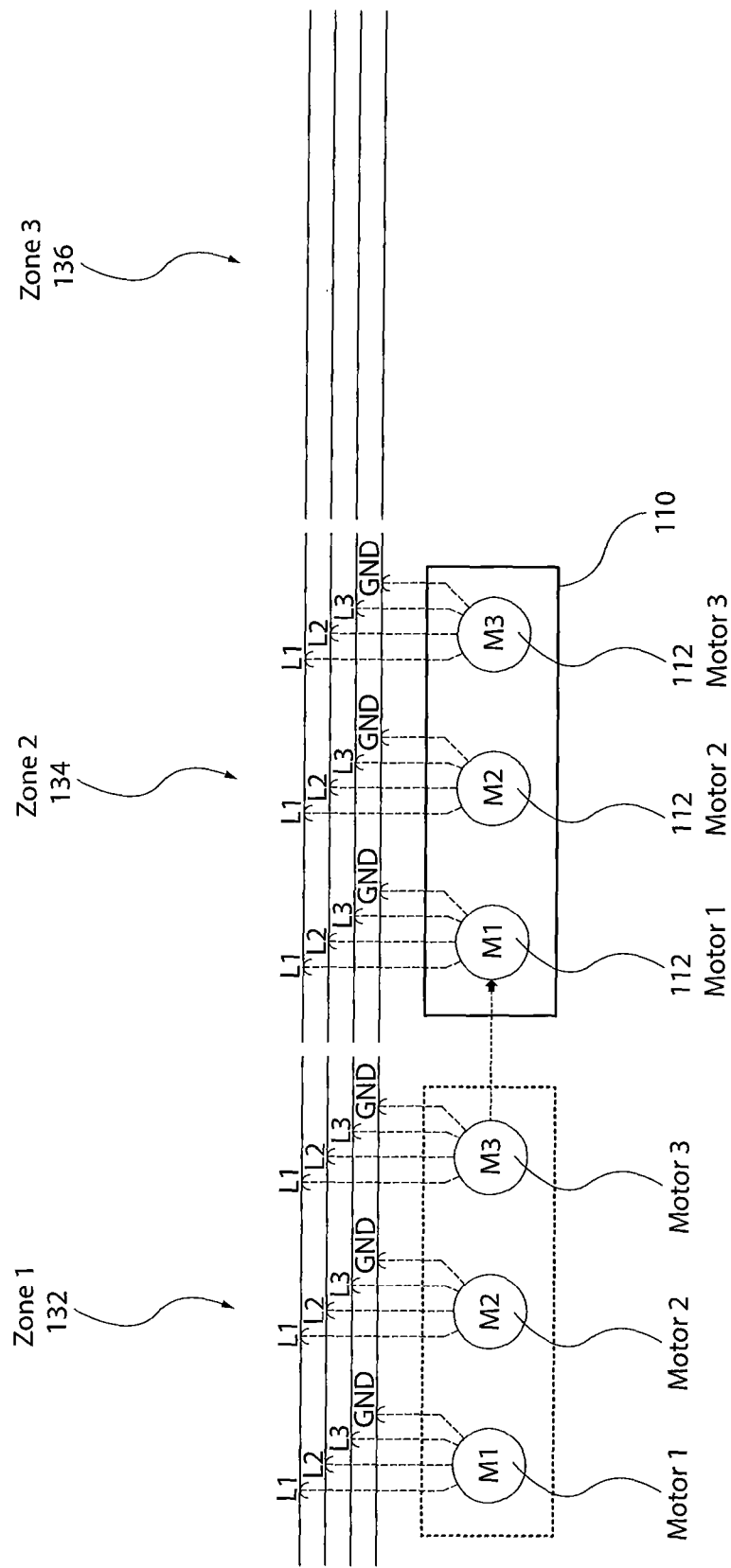
FIG. 4 depicts a diagrammatic view of diagrammatic view of a carrier advancing from one zone to another in the electrified monorail system of FIG. 1.

FIG. 4 shows an exemplary motion of carrier (110) from the first zone (132) to the second zone (134). It will be appreciated in some cases, a single carrier (110) may contain three motors (112). In other cases, a single carrier (110) may have a two or a single motor (112). Other suitable configurations will be apparent to one of ordinary skill in the art in view of the teachings herein. First zone (132) is energized by conductor bar (120), thereby providing power to motor (112). As motor (112) is powered, carrier (110) advances from first zone (132) to second zone (134). As carrier (110) advances to second zone (134), first zone (132) becomes de-energized. It will be appreciated that first zone (132) and second zone (134) are equipped with sensors, etc. or other suitable mechanisms operable to determine the presence of carrier (110). Once carrier (110) reaches second zone (134); second zone (134) becomes energized and powers carrier (110). Subsequently, motor (112) would continue to advance carrier (110) to third zone (136). Once in third zone (136), second zone (134) would no longer be energized and third zone (136) would become energized to continue movement of carrier (110).

Figure 5:
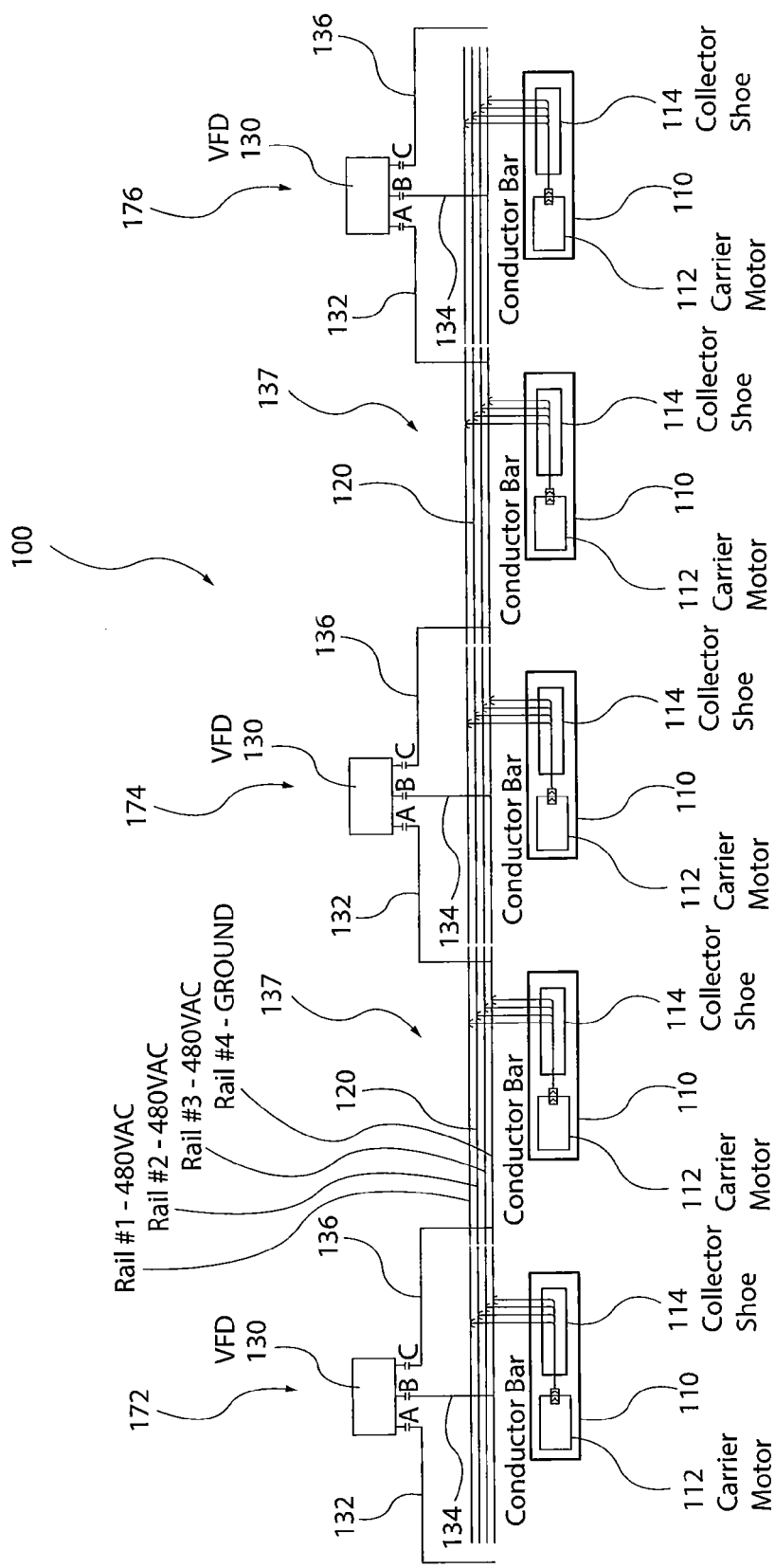
FIG. 5 depicts a diagrammatic view of the electrified monorail system of FIG. 1 with an overlap region.

FIG. 5 shows a version of EMS (100) having an overlapping region (137). In particular, a first VFD region (172), a second VFD region (174), and a third VFD region (176) are serially, adjacently positioned. Each VFD region (172, 174, 176) are regions (150) powered by a single VFD (130). Adjacent VFDs (130) are positioned close enough together such that third zone (136) of first VFD region (172) and first zone (132) of second VFD region (174) forms overlapping region (137). It will be understood that overlapping region (137) may be powered by more than one VFD (130). In particular, VFD (130) of first VFD region (172) or VFD (130) of second VFD region (172) may power overlapping region (137). It will be understood that a logic controller may be integrally formed with VFDs (130) or any other component of EMS (100) such that no single overlapping region (137) is powered by the same VFD (130) at any one time.

Figure 6:
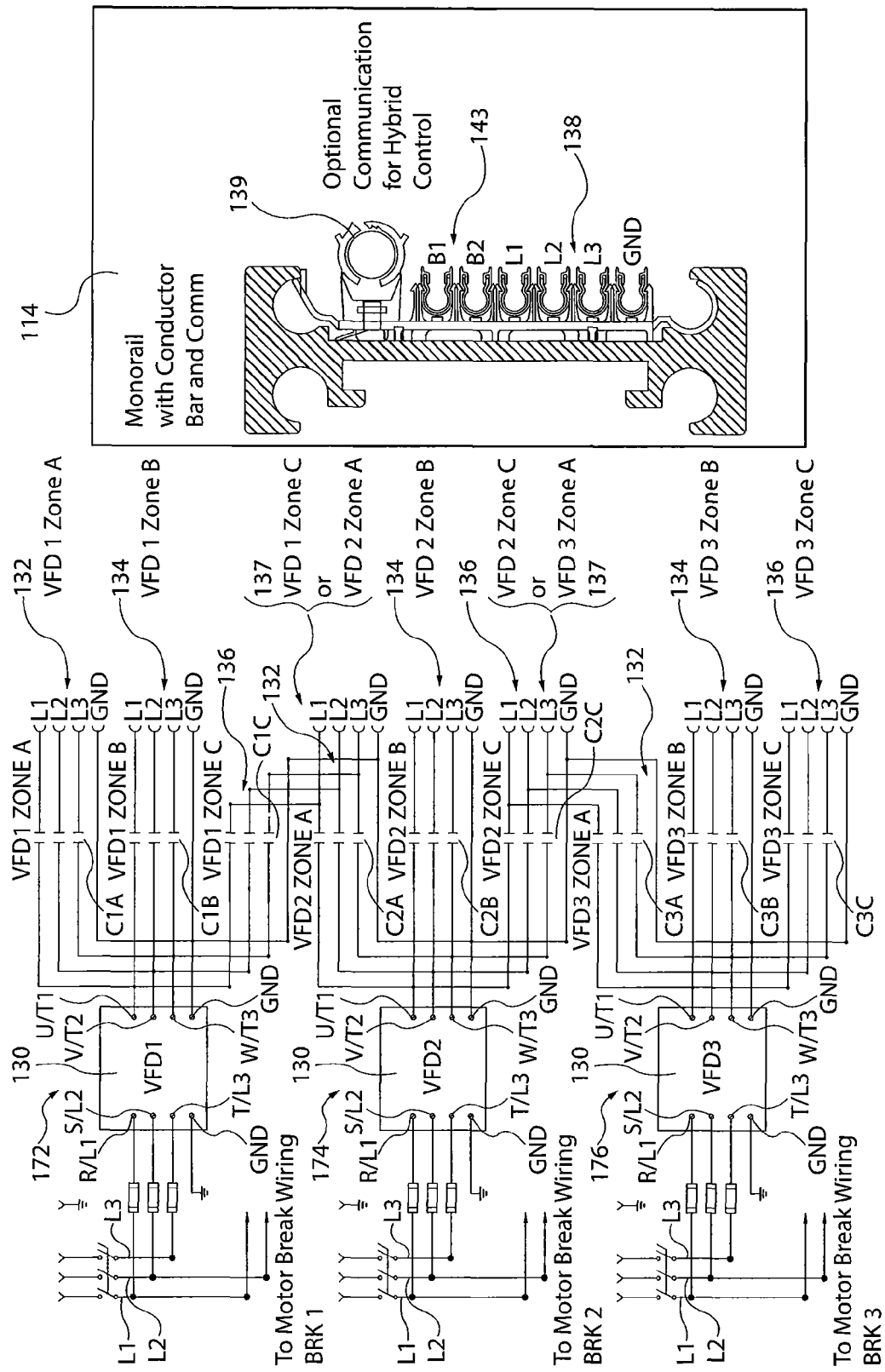
FIG. 6 depicts a schematic view of the interface between the conductor bar and the collector shoe of the electrified monorail system of FIG. 5.

FIG. 6 shows an enlarged schematic diagram of how VFDs (130) would interact with collector shoe (114). VFDs (130), as seen in the illustrated version are positioned adjacent to each other such that first zone (132) from one VFD (130) (for instance, from second VFD region (174)) are in communication with third zone (136) of the adjacent VFD (130) (for instance, from first VFD region (172)), thereby forming overlapping region (137). It will be appreciated that in the exemplary version, overlapping region (137) may be powered by either VFD (130) of first VFD region (172) or VFD (130) of second VFD region (174). Furthermore, for the next overlapping region (137) either VFD (130) of second VFD region (174) or VFD of third VFD region (176) may be operable to provide power to the next overlapping region (137). It will be understood that such a configuration may be continued along the length of EMS (100). It will further be understood that such a configuration may be used in only a portion of EMS (100). Other suitable configurations will be apparent to one of ordinary skill in the art in view of the teachings herein.

Collector shoe (114) is in communication with carrier (110) as shown above. In the exemplary version, collector shoe (114) includes interface leads (138). Interface leads (138) are operable to engage any of first zone (132), second zone (134), or overlapping region (137) as collector shoe (114) advances along conductor bar (120). When interface leads (138) engage any of first zone (132), second zone (134), or overlapping region (137), of the respective VFD (130), VFD (130) is then able to energize interface leads (138) of collector shoe (114). Collector shoe (114) also includes optional communication connection (139), which may be used for hybrid controls, which will be discussed in further detail below.

Figure 7:
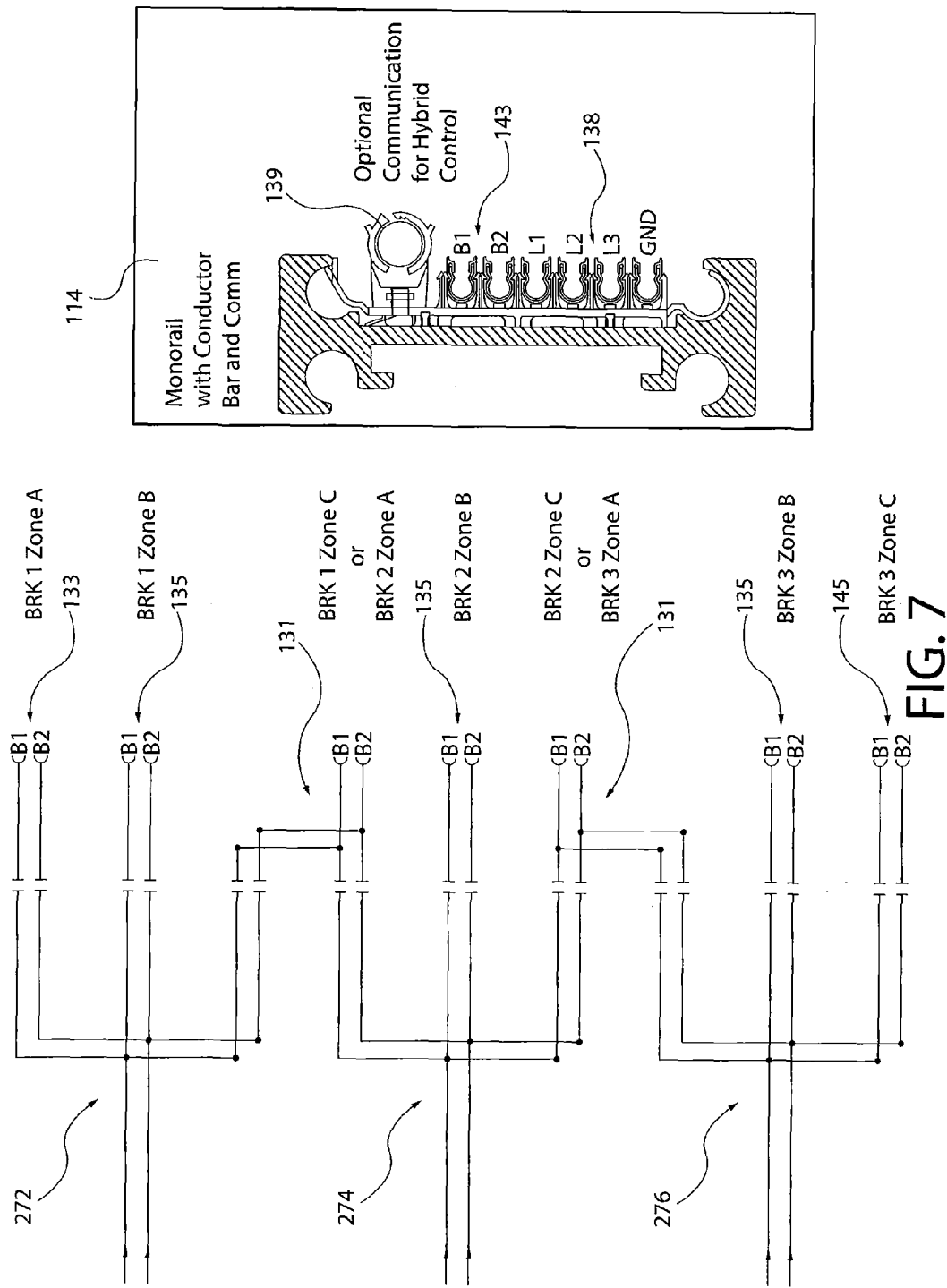
FIG. 7 depicts a schematic view of braking zones of the electrified monorail system of FIG. 5 showing the interface between the brake zones and the collector shoe.

Furthermore, collector shoe (114) includes brake interface (143) operable to interface with any of first zone (132), second zone (134), overlapping region (137), or third zone (136). In particular, turning to FIG. 7, brake interface (143) is operable to engage a first brake zone (133), a second brake zone (135), a third brake zone (145), or overlapping brake zone (131). It will be understood that each of brake zones (133, 135, 145, 131) have interfaces operable to engage brake interface (143). As also seen in FIG. 7, first brake zone (133), second brake zone (135), third brake zone (145), and overlapping brake zone (131) are grouped into first brake region (272), second brake region (274), and third brake region (276). It will be understood that first brake region (272) corresponds to first VFD region (172), second brake region (274) corresponds to second VFD region (174), and third brake region (276) corresponds to third VFD region (176). Once engaged by brake interface (143), first brake zone (133), second brake zone (135), third brake zone (145), or overlapping brake zone (131) are configured to control braking of carrier (110) through brake interface (143). First brake region (272), second brake region (274) and third brake region (276) are configured to send instructions regarding braking of carrier (110) through braking interface (143).

Figure 8A:
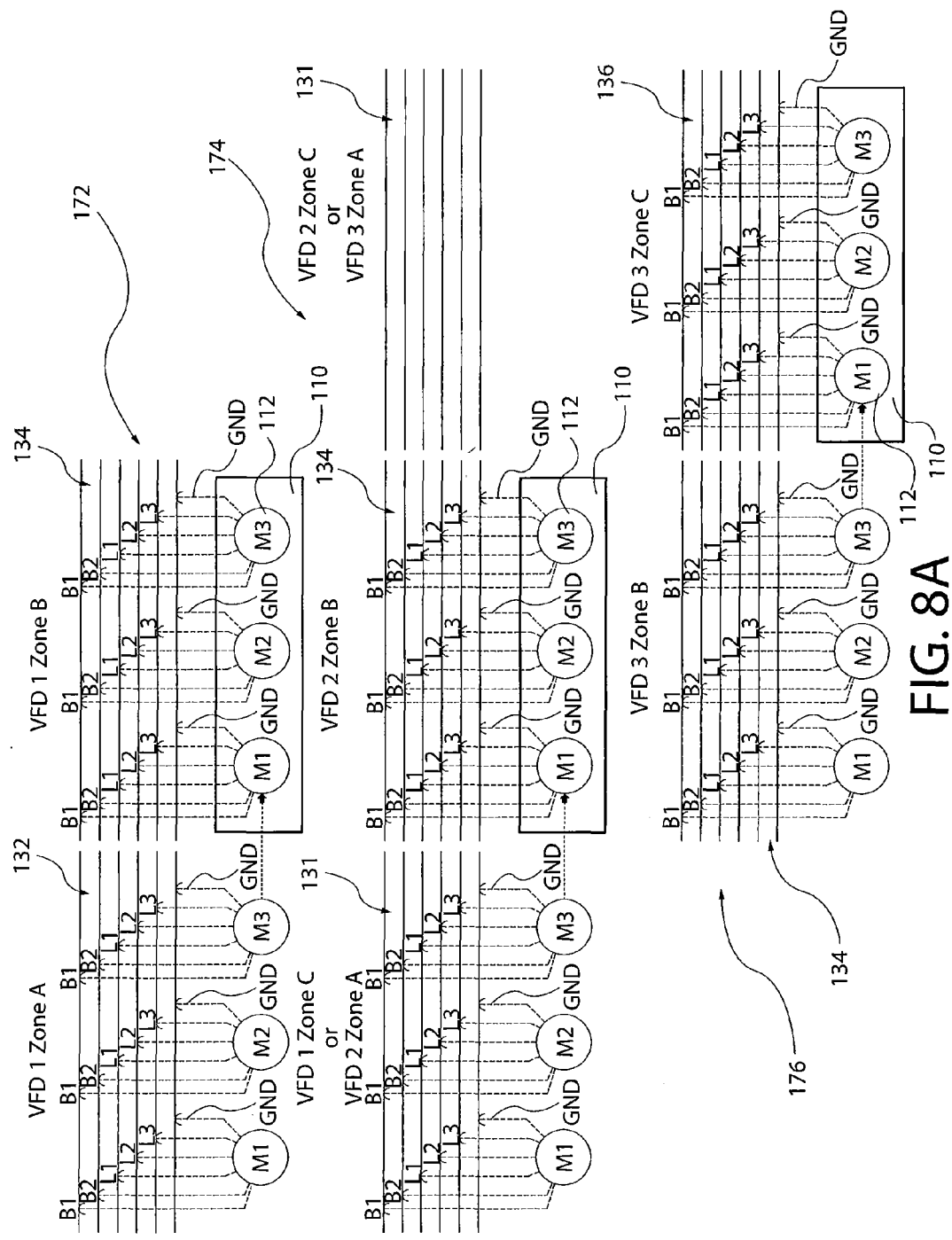
FIG. 8A shows a diagrammatic view of the electrified monorail system of FIG. 6 showing carriers advancing from one zone to another.
Figure 8B:
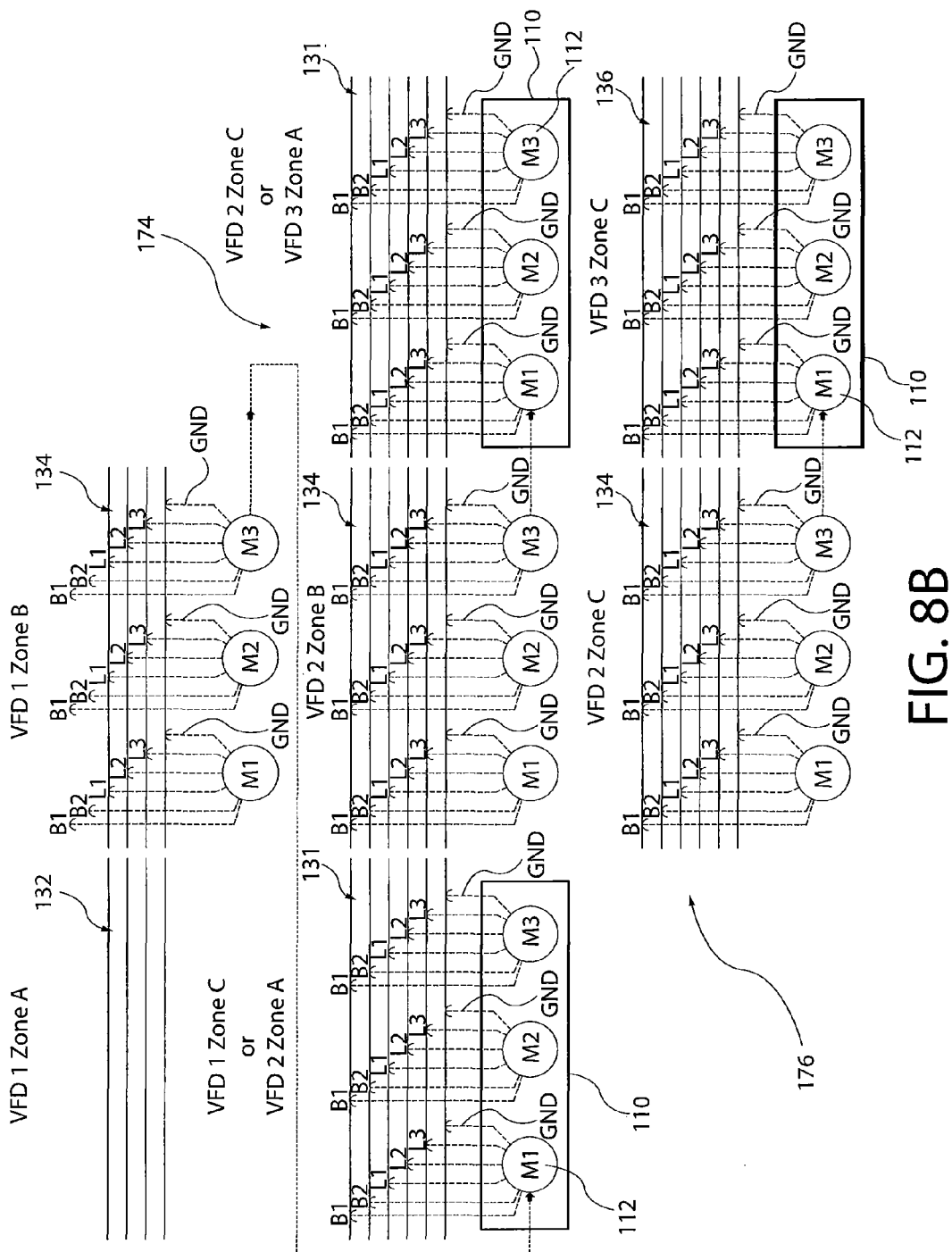
FIG. 8B shows a diagrammatic view of the electrified monorail system of FIG. 8A with the carriers advanced another zone.
Figure 8C:
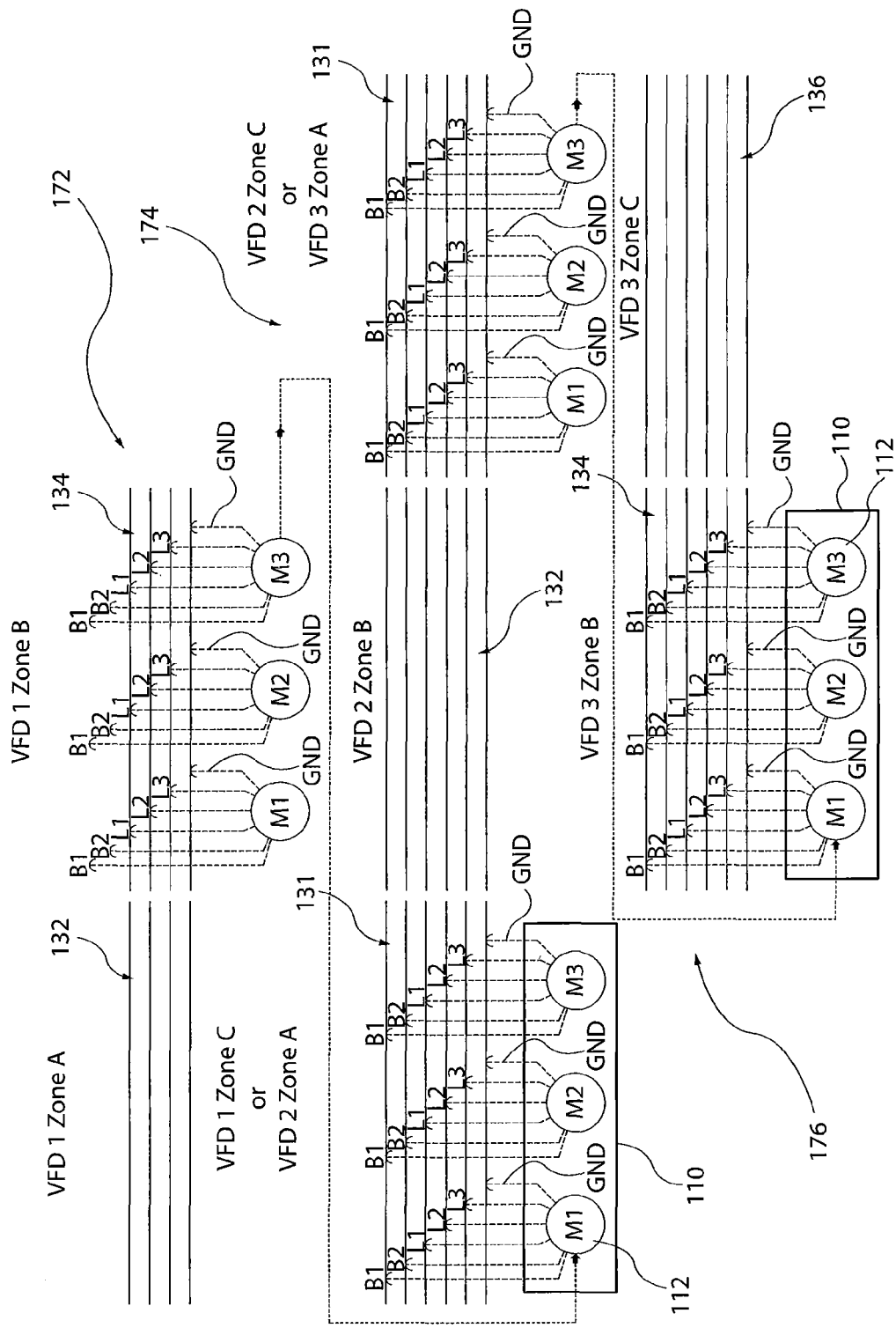
FIG. 8C shows a diagrammatic view of the electrified monorail system of FIG. 8A with the carriers advanced yet another zone.

FIGS. 8A-8C show an exemplary movement of carrier (110) through VFD regions of EMS (100). In particular, carrier (110) moves from first VFD region (172) to second VFD region (174) to third VFD region (176). In FIG. 8A, a carrier (110) has moved from first zone (132) to second zone (134) of first VFD region (172). Another carrier (110) has moved from overlapping region (131) to second zone (134) of second VFD region (174). Finally a third carrier (110) has moved from second zone (134) to third zone (136) of third VFD region (176). It will be understood that all three carriers (110) may move at the same time.

For instance, when carrier (110) moves from first zone (132) to second zone (134) of first VFD region (172), first zone (132) energizes carrier (110) such that motor (112) advances carrier (110) to second zone (134). Upon leaving first zone (132), first zone (132) de-energizes. It will be appreciated that when carrier (110) moves from first zone (132) to second zone (134), one or more motors (112) may be positioned in first zone (132) and second zone (134) simultaneously such that different motors (112) of a single carrier (110) may be powered by different zones. In other words, motors (112) of a carrier (110) may straddle two zones (132, 134) and receive power directed to different motors (112) within carrier (110) from the separate zones (132, 134). However, it will be understood that a single motor (112) is not powered by both first zone (132) and second zone (134) simultaneously. It will further be appreciated that other carriers (110) may be powered as they move through VFD regions (172, 174, 176) in a similar manner.

FIG. 8B shows carrier (110) leaving second zone (134) of first VFD region (172) and entering overlapping region (131) between first VFD region (172) and second VFD region (174). Another carrier (110) leaves second zone (134) of second VFD region (174) to enter overlapping region (131) of second VFD region (174). Finally, a third carrier (110) leaves second zone (134) to enter third zone of third VFD region (176).

FIG. 8C shows carriers (110) continuing the path by a carrier (110) moving from second zone (134) of first VFD region (172) to overlapping region (131) between first VFD region (172) and second VFD region (174). Furthermore another carrier (110) moves from overlapping region (131) between second VFD region (174) and third VFD region (176) to second zone (134) of third VFD region (134). It will be understood that the motion and movements shown in FIGS. 8A-8C are merely exemplary and other suitable motions and numbers of carriers (110) may be used as would be apparent to one of ordinary skill in the art in view of the teachings herein.

Figure 9:
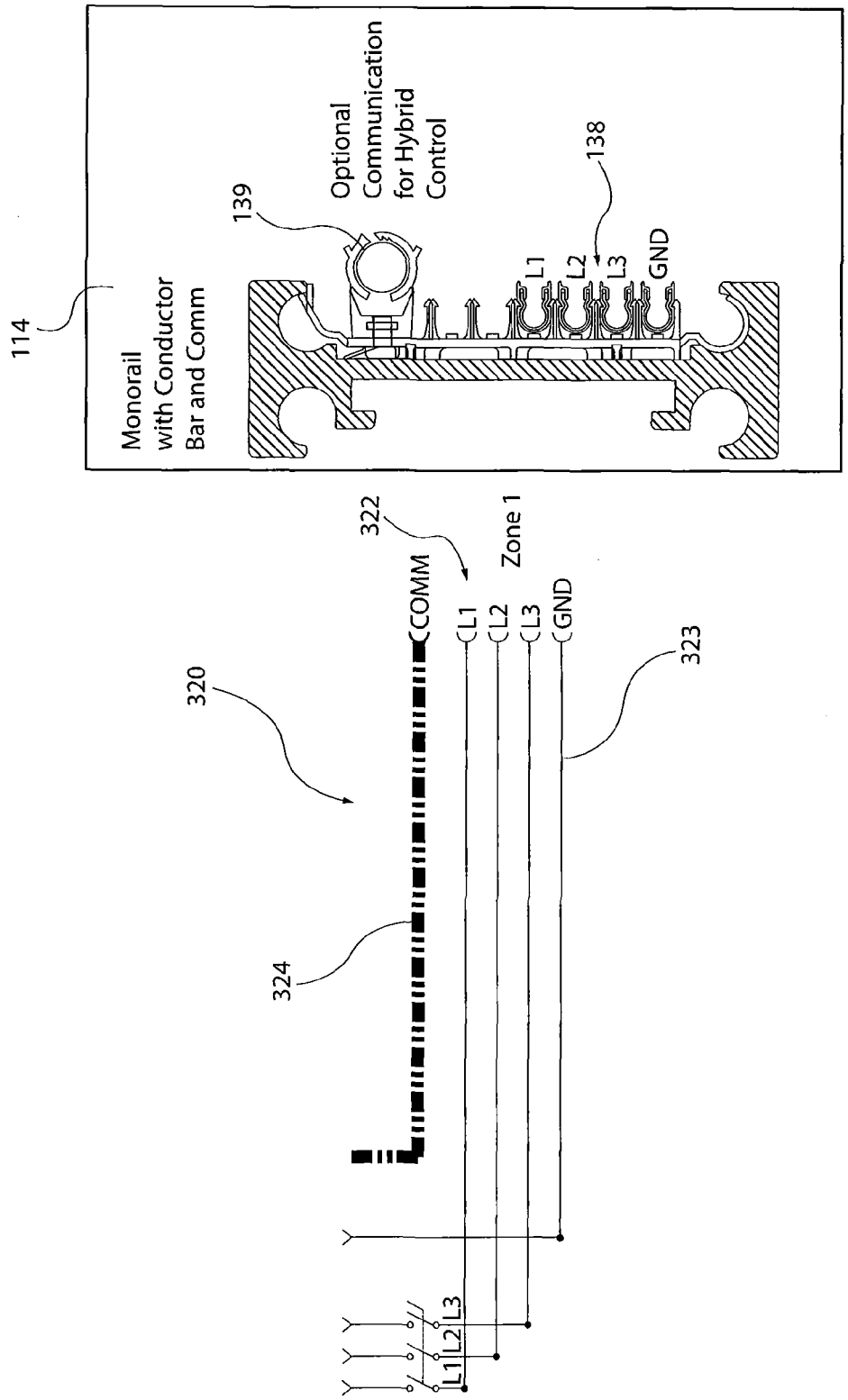
FIG. 9 shows an enlarged diagrammatic view of an alternative exemplary conductor bar with an optional communication connection.

FIG. 9 shows collector shoe (114) with an alternative exemplary conductor bar (320). Conductor bar (320) comprises a plurality of rails (322), a ground (323), and an optional communication rail (324). It will be understood that rails (322) and ground (323) are substantially similar to rails (122) and ground (123) of FIG. 2. Optional communication rail (324) is configured to engage optional communication connection (139). It will be appreciated that in some versions, optional communication connection (139) may comprise a leaky coaxial communication cable. It will further be understood that communication between optional communication rail (324) and optional communication connection (139) may be established through a non-contact antenna. However, it will be understood that optional communication rail (324) and optional communication connection (139) may comprise any suitable communicating components or may communicate through any suitable means as would be apparent to one of ordinary skill in the art in view of the teachings here. In some instances as described above, optional communication rail (324) and optional communication connection (139) need not be in direct contact to communicate. Optional communication rail (324) is configured to communicate with a remotely positioned control board such that instructions, commands, etc. may be sent to each carrier (110) through optional communication rail (324). Furthermore, it will be appreciated that in some versions, a separate VFD (130) may be incorporated with each carrier (110), which then requires optional communication rail (324) to establish communication with each carrier (110) to provide instructions, etc. to each individual carrier (110). However, it will be understood that other configurations will be apparent to one of ordinary skill in the art in view of the teachings herein.

Figure 10:
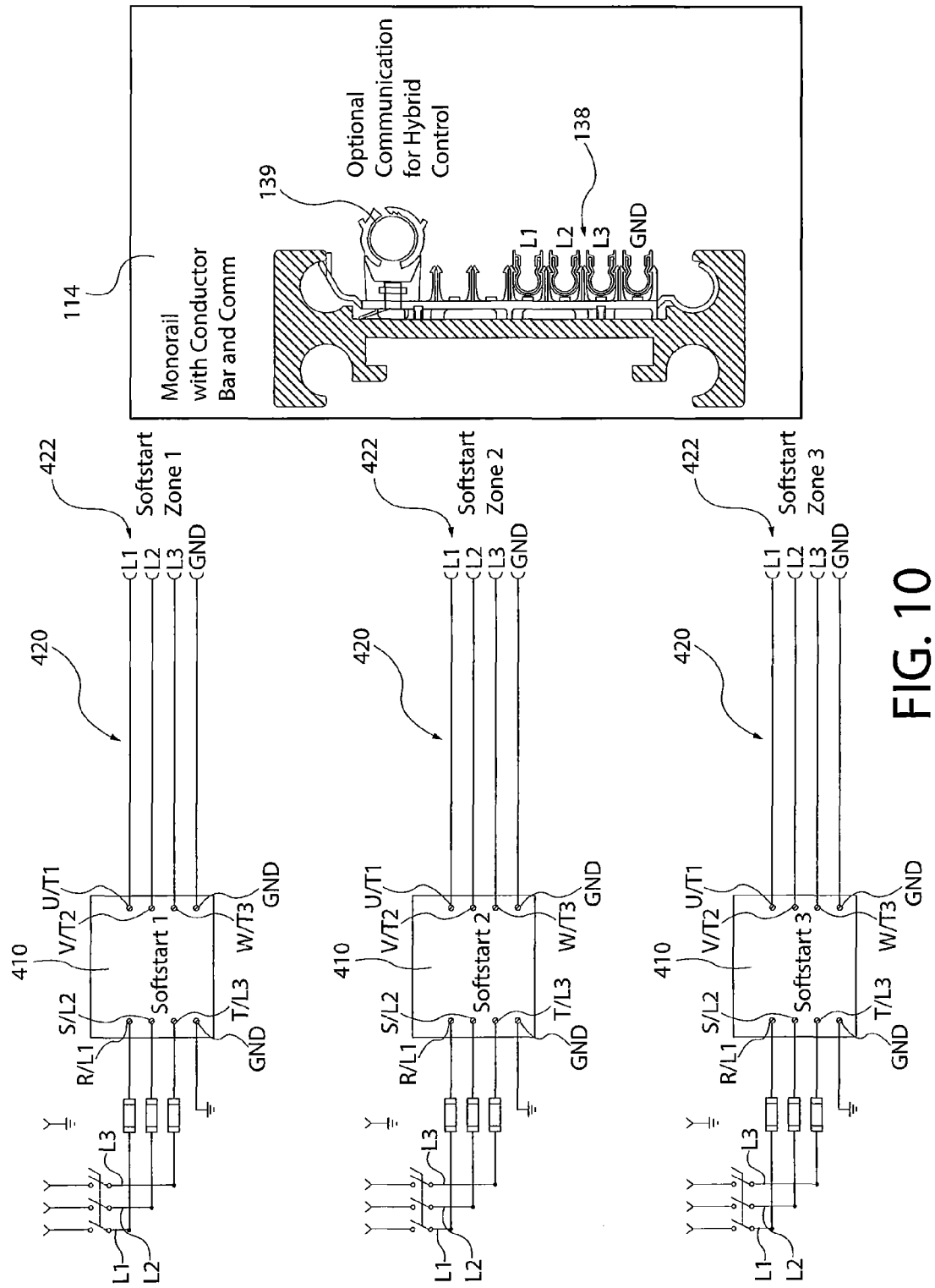
FIG. 10 shows an enlarged diagrammatic view of an alternative exemplary conductor bar with a soft start device and a collector shoe.

It will be appreciated that in some instances, it may be desirable to control the speed at which motor (112) starts the movement of carrier (110). FIG. 10 shows collector shoe (114) and a soft start device (410). A conductor bar (420) having a plurality of rails (422) are in selective communication with collector shoe (114). It will be understood that conductor bar (420) and plurality of rails (422) are substantially similar to conductor bar (120) and rails (122) of FIG. 2. Soft start device (410) is in communication with rails (422). It will be understood that soft start device (410) may include a single chip or a plurality of chips operable to limit torque with voltage and/or current such that motors (112) start gradually rather than instantly. In some instances, soft start device (410) comprises an ALLEN BRADLEY Bulletin 283 ArmorStart Solid State Motor Control Device having a rating of 24V DC and 25 A operable to provide output current from 6.3 A to 16 A. However, it will be understood that any suitable motor control device may be used for soft start device (410) as would be apparent to one of ordinary skill in the art in view of the teachings herein.

Figure 11:
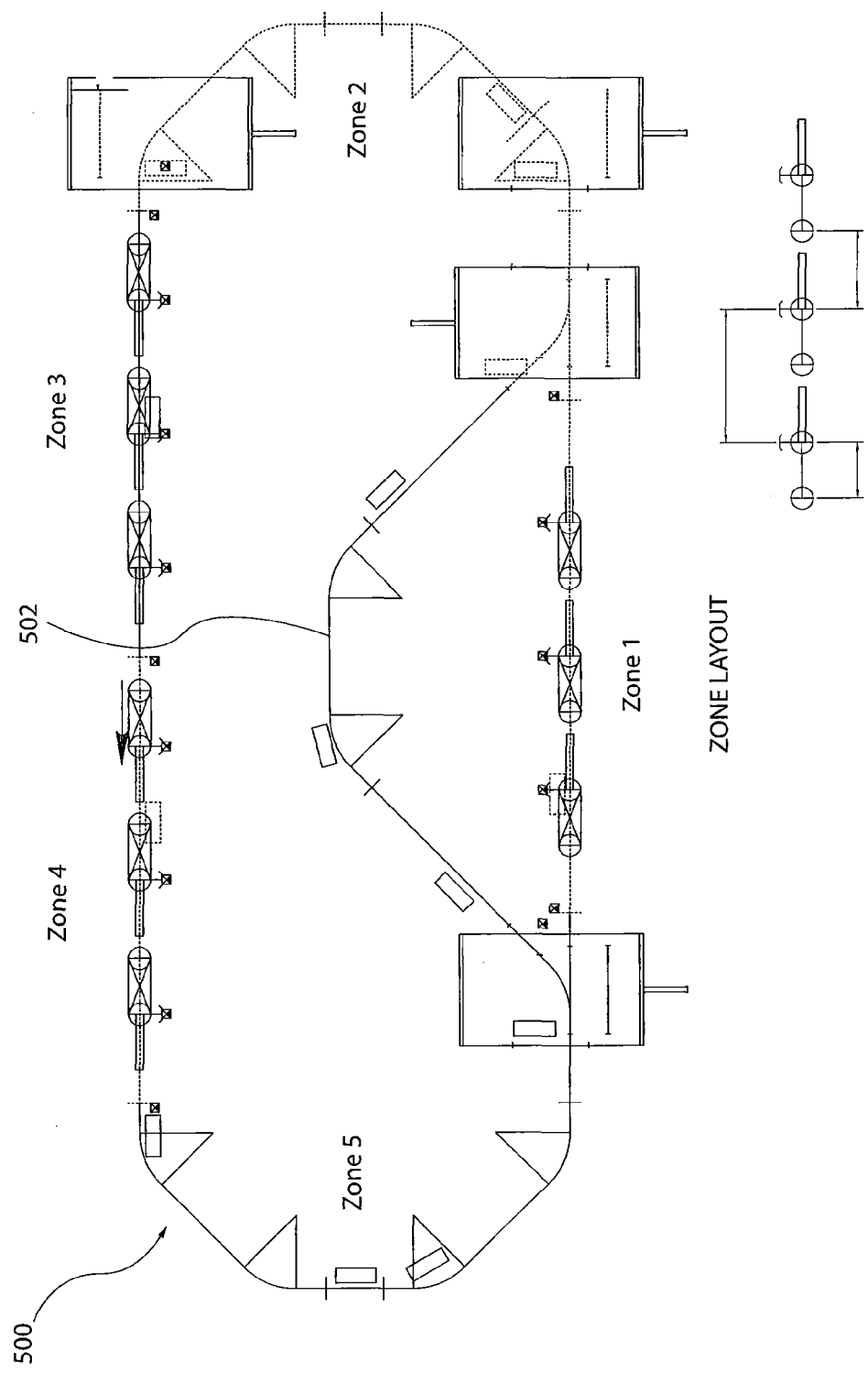
FIG. 11 shows a top diagrammatic view of an alternative exemplary electrified monorail system with a different shape.

FIG. 11 shows another exemplary EMS (500) having a different shape than EMS (100) of FIG. 1. It will be appreciated that while a rounded rectangular shape was shown in FIG. 1, and a similar shape with a bypass rail (502) is shown in FIG. 11, any suitable shape for EMS (500) may be used as would be apparent to one of ordinary skill in the art in view of the teachings herein.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. An apparatus comprising:
   (a) a conductor bar operable to form a portion of a track;
   (b) a plurality of carriers, wherein each of the plurality of carriers comprises a collector shoe operable to engage the conductor bar to enable each of the plurality of carriers to advance along the track, wherein each of the plurality of carriers further comprises a motor, wherein the motor power control device is configured to deliver power to the motor of a respective carrier through the collector shoes, wherein each motor is operable to advance the respective carrier; and
   (c) a motor power control device, wherein the motor power control device is configured to deliver power to the collector shoes associated with each of the plurality of carriers to drive the plurality of carriers along the track.

2. The apparatus of claim 1, wherein the motor power control device is configured to deliver variable power to at least one of the collector shoes.

3. The apparatus of claim 1, further comprising another motor power control device, wherein the motor power control devices are configured to alternatingly provide power to each of the plurality of carriers.

4. The apparatus of claim 1, wherein the motor power control device is remotely positioned in relation to the plurality of carriers.

5. The apparatus of claim 1, wherein the motor power control device comprises a soft start device.

6. The apparatus of claim 1, wherein the motor power control device comprises a variable frequency driver.

7. The apparatus of claim 1, wherein the conductor bar comprises a plurality of zones, wherein the motor power control device is configured to deliver power to the collector shoes when the collector shoes are positioned on only some of the zones.

8. The apparatus of claim 7, wherein the motor power control device is configured to deliver power to a collector shoe when the collector shoe is positioned on multiple sequential zones.

9. An apparatus comprising:
   (a) a conductor bar comprising a set of serially positioned zones, wherein each of the zones comprises at least a first region and an adjacent second region, wherein the second region of at least one of the zones overlaps the first region of an adjacent one of the zones to thereby form an overlapping region;
   (b) a carrier, wherein the carrier comprises:
      (i) a collector shoe configured to engage the conductor bar, and
      (ii) a motor configured to advance the carrier along the conductor bar through the zones when power is delivered to the collector shoe; and
   (c) a plurality of motor power control devices, wherein each of the plurality of motor power control devices is configured to selectively deliver power to the collector shoe, wherein the overlapping region is in communication with two of the plurality of motor power control devices such that the collector shoe is configured to receive power from either of the two motor power control devices when the carrier is positioned on the overlapping region.

10. The apparatus of claim 9, wherein each of the zones further comprises a middle region between the first region and the second region.

11. The apparatus of claim 10, wherein the collector shoe is configured to receive power from only one of the plurality of motor power control devices when the carrier is positioned on the middle region.

12. The apparatus of claim 9, wherein at least one of the plurality of motor power control devices comprises a soft start device.

13. The apparatus of claim 9, wherein at least one of the plurality of motor power control devices comprises a variable frequency driver.

14. The apparatus of claim 9, wherein at least one of the plurality of motor power control devices is positioned remotely in relation to the plurality of carriers.

15. An apparatus comprising:
(a) a conductor bar comprising a set of serially positioned zones;
(b) a carrier, wherein the carrier comprises:
    (i) a collector shoe configured to engage the conductor bar, and
    (ii) a motor configured to advance the carrier along the conductor bar along the zones when power is delivered to the collector shoe; and
(c) a plurality of motor power control devices, wherein each of the plurality of motor power control devices is configured to selectively deliver power to the collector shoe as the carrier advances along the conductor bar, wherein at least one of the zones is in communication more than one of the plurality of motor power control devices.

16. The apparatus of claim 15, wherein at least one of the plurality of motor power control devices is configured to deliver power to a collector shoe when the collector shoe is positioned on multiple zones.

17. The apparatus of claim 15, wherein at least one of the plurality of motor power control devices is configured to deliver power to a collector shoe when the collector shoe is positioned on only one of the zones.

18. An apparatus comprising:
(a) a conductor bar, wherein a portion of the conductor bar defines a zone;
(b) a plurality of carriers configured to advance along the conductor bar, wherein each of the plurality of carriers comprises:
    (i) a motor configured to advance the carrier, and
    (ii) a collector shoe configured to engage the conductor bar; and
(c) at least two motor power control devices in selective communication with the collector shoe of the plurality of carriers, wherein each of the motor power control devices are configured to serially provide power to each of the plurality of carriers without simultaneously providing power to each of the plurality of carriers.

19. A method of advancing a carrier along a conductor bar with a first motor power control device, a second motor power control device, a motor positioned on the carrier, and a collector shoe on the carrier, the method comprising:
(a) engaging the conductor bar with the collector shoe;
(b) providing power to the carrier via the first motor power control device;
(c) driving the plurality of motors;
(d) advancing the carrier along the conductor bar;
(e) determining that the carrier has advanced along the conductor bar;
halting the power to the carrier by the first motor power control device; and
(g) providing power to the carrier via the second motor power control device.

* * * * *

UNITED STATES PATENT AND TRADEMARK OFFICE
CERTIFICATE OF CORRECTION

PATENT NO. : 9,796,295 B2
APPLICATION NO. : 14/753709
DATED : October 24, 2017
INVENTOR(S) : Kim Wayne Potter et al.

It is certified that error appears in the above-identified patent and that said Letters Patent is hereby corrected as shown below:

In the Claims

Column 9, Claim 15 (c), Line 22, reads "...more than one of the plurality..."; which should be deleted and replaced with "...with more than one of the plurality..."

Column 10, Claim 19, Line 27, reads "...halting the power to the carrier..."; which should be deleted and replaced with "...(f) halting the power to the carrier..."

Signed and Sealed this
Twelfth Day of December, 2017

Joseph Matal
*Performing the Functions and Duties of the
Under Secretary of Commerce for Intellectual Property and
Director of the United States Patent and Trademark Office*